June 24, 1930. E. A. TAMBERT 1,767,718
SCANNING DEVICE
Filed Feb. 23, 1929  2 Sheets-Sheet 1
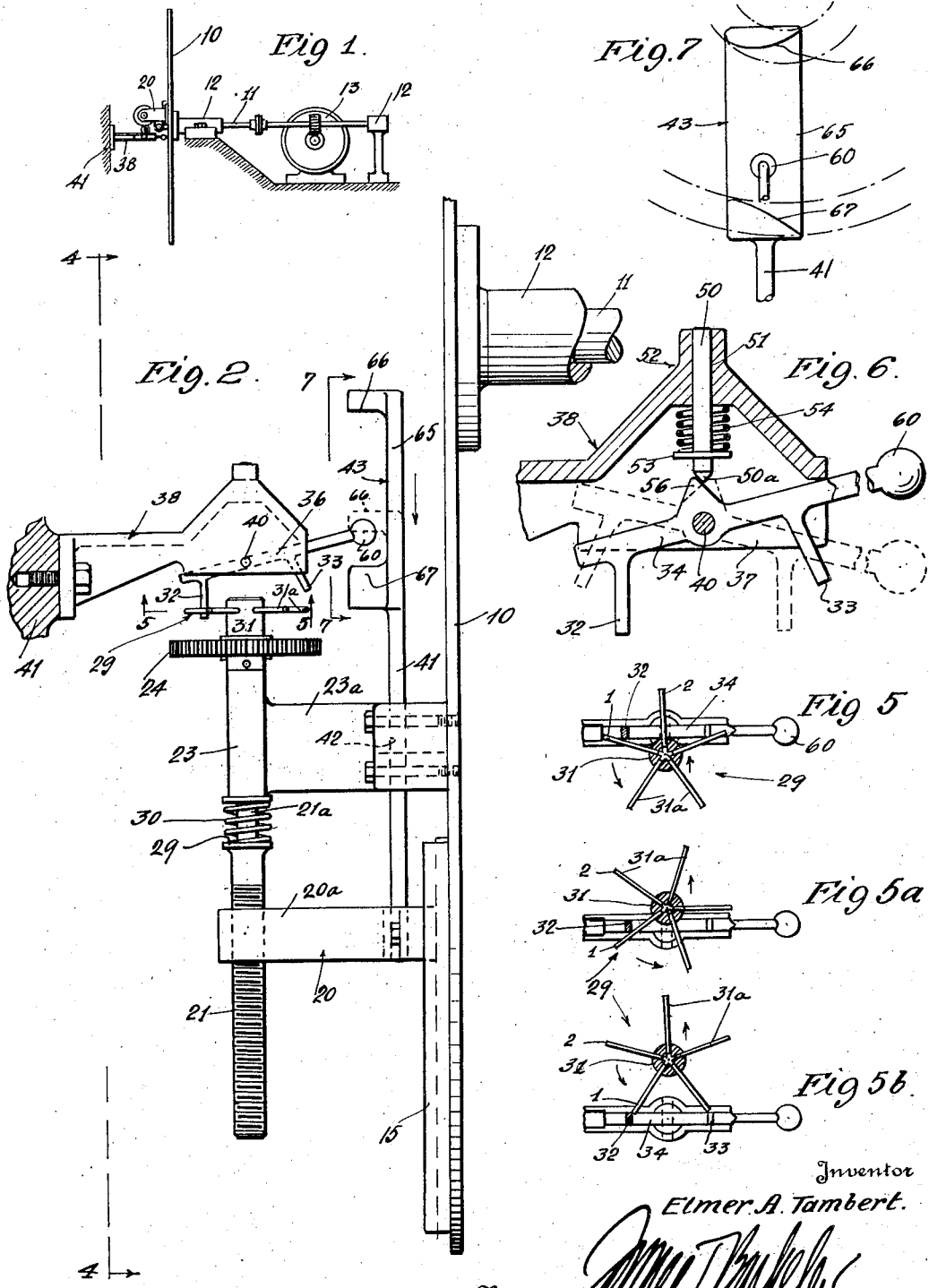

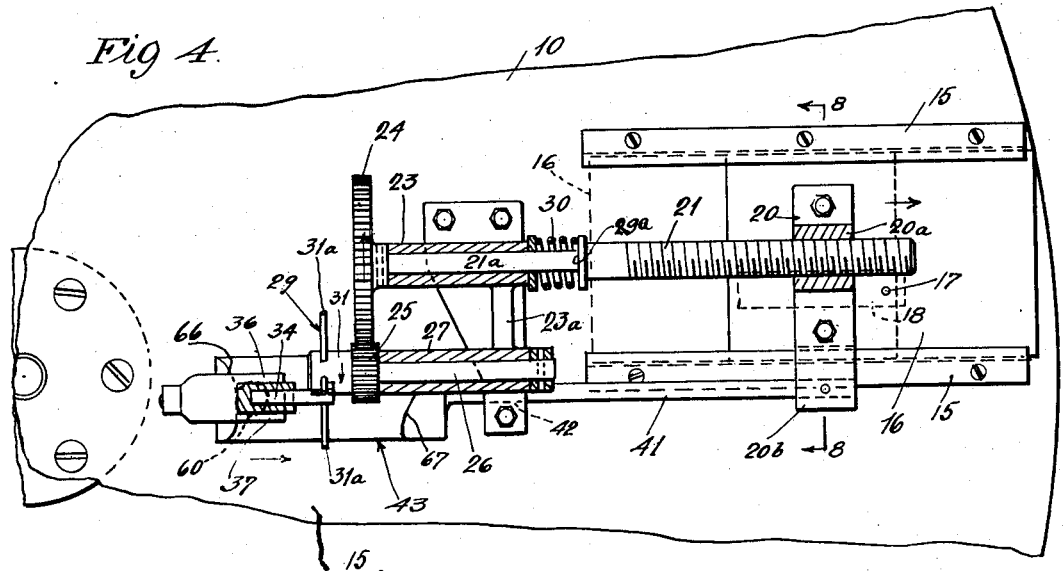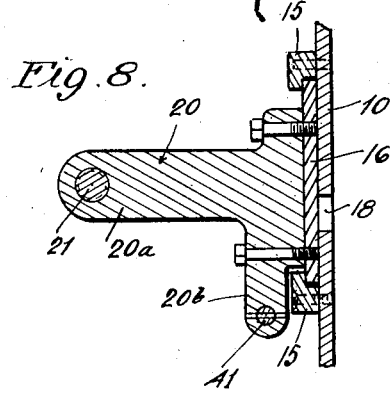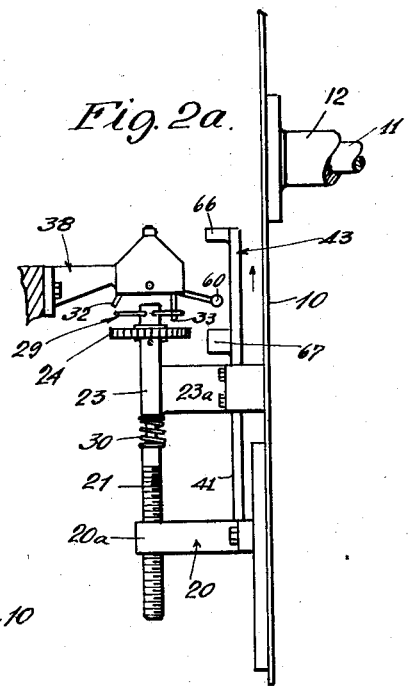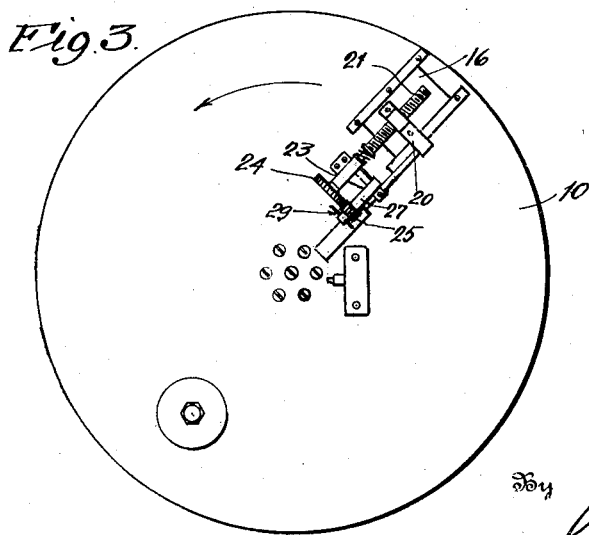

Patented June 24, 1930

1,767,718

UNITED STATES PATENT OFFICE

ELMER A. TAMBERT, OF CULVER CITY, CALIFORNIA

SCANNING DEVICE

Application filed February 23, 1929. Serial No. 342,011.

This invention relates to the art of transmitting pictures to a distance by electricity. While the invention is in principle equally applicable to the transmission of moving pictures or views having objects in motion (television), the present physical illustrative embodiment of the invention is more particularly adapted to the transmission of still pictures (telephotography), and the invention will therefore be specifically described and illustrated with that application particularly in view, but without necessary limitation thereto.

As is well understood in the art, a system for the transmission of either still or moving views must comprise some means for changing the space variations in brightness from point to point in the view into time variations in an electrical current at the sending end of the system, and some means for changing these time variations in current back into space variations in brightness upon a screen or film at the receiving end system.

The first of these means may comprise some mechanically moved arrangement or device by which the same effect is obtained as if the view to be transmitted were cut up into a single long strip and passed before a light sensitive element to produce an electrical current varying with the brightness along the strip. The second of these means, which is located at the receiving end of the system, may comprise a device mechanically driven in exact synchronism with the first mentioned means, and operating to give the same effect as if the raw film or screen upon which the picture is to be reproduced were cut up into a single long strip and passed before the spot of a light beam which is governed in intensity by the transmitted electrical current.

According to a well known still picture transmitting system, the means for converting space variations in brightness into time variations in electrical current comprises an arrangement whereby a celluloid film transparency of the view is bent into the form of a cylinder and placed in a carriage, which rotates the film cylinder on its axis, and moves it longitudinally on its axis by means of a screw. A spot of light thrown upon the film as it is moved then traverses the entire film area in a long spiral, and, passing through the film cylinder, affects a photo electric cell mounted therewithin in accordance with the densities of the successive elemental film areas passed before the light spot. The photo electric cell thereupon generates electrical pulsations representing the density characteristics of the view, and these pulsations are suitably amplified and transmitted to the receiving end of the system. At the receiving end a raw film is mounted similarly to the original transparency and is rotated in exact synchronism therewith, but the spot of light thrown upon its surface in this case is caused to be varied in accordance with the transmitted electrical pulsations, so that successive elemental film areas are light-affected in exact accordance with the density of the corresponding elemental film area of the sending transparency.

This rotating film-cylinder arrangement is, of course not adapted to the requirements of television. In television, the well known rotating scanning disk having a series of spirally arranged holes is now ordinarily employed. This disk is either arranged to scan the subject by means of its spirally arranged holes, the light from an elemental area of the subject passing through a single aperture at any instant to affect the photo electric cell; or, in another arrangement, a spot of light projected from a single source is moved over the entire area of the subject by passing through the successive apertures passing before the source, the light reflected from the subject in this case affecting photo electric cells positioned nearby. By either of these latter arrangements it is possible to transmit either from the moving subject itself or from a moving picture thereof. And a television disk of this type is, of course, also available for the transmission of still pictures, although is far inferior for that purpose as regards preservation of detail to the system previously described.

Both of these systems, however, have certain limitations. The first described system—that in which the transmitting is done from a transparency of the view bent into the form of a cylinder—is obviously limited to the transmission of still pictures converted into the form of film transparencies, and does not provide for directly transmitting from a photograph or from the object itself. The second system—that employed in television—includes a disk that has one aperture for each parallel "slice" that the picture or view is to be divded into in transmission, and these apertures must be spaced apart about the disk so that only one aperture is effective at a time. For the present purposes of television, a scanning disk of approximately twenty-four inches in diameter and having fifty apertures has been employed, thus causing the view to be divided in transmission into fifty elemental parallel strips, or 2500 elemental areas. While such a division may be adequate for the present in television, it is not adequate for the transmission of still pictures; and the requirements of television will undoubtedly call for far more detail to be preserved than is conveniently possible by the use of a scanning disk of the present form, when the problems of transmission at higher frequencies are solved. It is quite apparent that the present scanning disk cannot be provided with sufficient apertures to divide a view into such a number of elemental areas as would compare favorably with the rotating film-cylinder system (which ordinarily is made to divide a five by seven picture into 100 bands to the inch, or into 350,000 elemental areas) without becoming inordinately large in diameter.

Thus the rotating film cylinder is not adapted to transmit directly from an object or photograph, although this system attains a certain excellence in the preservation of detail. And while the televison scanning disk, if utilized in the transmission of still pictures, would make possible such transmission directly from the object, or from a photograph thereof, the present television scanning disk is entirely inadequate as regards the preservation of detail in such a system. Further, while the present television scanning disk may be adequate in television for the present state of the art, it will not be adequate when it becomes expedient to transmit moving pictures without great loss of detail.

Accordingly, it is an object of my invention to provide a scanning device adapted to transmit pictures either from transparencies, photographs or physical objects, and to accomplish this by dividing the view into as great a number of elemental areas as may be desired, or as may be transmittable, considering other factors of the system available.

The invention will be most clearly understood from the following detailed description of a physical embodiment designed specifically for the transmission of still pictures, although considered in its broader aspects, the invention will be recognized to be adaptable to television as well. Throughout the description, reference is had to the accompanying drawings, in which:

Figure 1 is a side elevation of my invention and driving means therefor;

Fig. 2 is an enlarged top plan view of the rotating disk and scanning mechanism;

Fig. 2$^a$ is a view similar to Fig. 2 but on a smaller scale, and showing the parts in another position;

Fig. 3 is an end elevation of the rotating disk;

Fig. 4 is a vertical section taken on line 4—4 of Fig. 2;

Fig. 5, 5$^a$ and 5$^b$ are similar fragmentary vertical sections taken on line 5—5 of Fig. 2, showing successive operative positions of certain parts of the mechanism;

Fig. 6 is a horizontal fragmentary section taken on line 6—6 of Fig. 5;

Fig. 7 is a detail of the yoke portion of the shifter rod; and

Fig. 8 is a vertical section taken on line 8—8 of Fig. 4.

Referring to Fig. 1 of the drawings, the numeral 10 indicates a rotating disk or carrier for certain parts of the scanning mechanism, disk 10 being mounted on a shaft 11 journalled in suitable bearings 12 and driven by an electric motor 13.

Referring now to Figs. 1, 2, 3, 4 and 8, disk 10 is provided with a pair of guide strips 15 which carry slidably an aperture plate 16 having a light aperture 17. Plate 16 is adapted to slide between the two end positions shown in full and dotted lines in Fig. 4. A light passing opening or slot 18 is provided in disk 10 in register with the path traversed by aperture 17 as plate 16 is carried between its end positions. There is thus provided a light aperture carried by a rotatable disk at a continuously variable distance from its axis of rotation. Means now to be described are provided for moving the aperture plate in its guides as the disk rotates, for the purpose of giving the light aperture motion in two directions with respect to the view being scanned, whereby the entire area of the view is traversed by the light aperture in a series of parallel bands. The narrowness of these bands, and the consequent fineness of preserved detail, will depend, of course, upon the characteristics of the aperture plate moving means. Such means may be embodied as follows:

Secured to the outer face of aperture plate 16 is a bracket 20, which is moved to slide the aperture plate in its guides by means of a lead screw 21 threaded through an arm 20$^a$ of the bracket. Screw 21 has a reduced portion 21$^a$ at its other end, that is journaled in a bearing 23 provided upon a bracket 23ª secured to disk 10. Fastened on the end of screw 21 adjacent bearing 23 is a spur gear 24, meshing with spur gear 25 on shaft 26, which shaft is journalled in a bearing 27 also provided on disk-bracket 23ª. The reduced portion 21ª of lead screw 21 provides an annular shoulder 29ª thereon, and encircling reduced portion 21ª between this shoulder and the adjacent end of bearing 23 there is preferably provided an expansion spring 30 to take up wear and looseness and insure precise lead screw movement.

It may now be seen that rotation of shaft 26 drives screw 21 and causes aperture plate 16 to be carried toward or away from the axis of the disk, the direction of movement depending, of course, upon the direction of rotation of shaft 26. Means are now provided for driving shaft 26 in both directions, so that operation may be carried on with plate 16 moving in either direction in its guides across disk 10.

On the end of shaft 26 adjacent gear 25 is a wheel 29, comprising a head 31 on the end of shaft 26 adjacent gear 25, which is provided with a plurality of outwardly extending teeth or prongs 31ª, here shown as five in number. These teeth are adapted to be contacted by one or the other of a pair of fingers 32 and 33 respectively, formed on a bar 34 that is pivotally mounted on a stationary support, and is adapted to occupy either the full or dotted line positions of Fig. 6. As shown in Figs. 2, 5 and 6, bar 34 is carried between the upper and lower walls 36 and 37 of a frame bracket 38, upon a pivot pin 40 fixed therein, said frame bracket being stationarily mounted upon a base member indicated at 41.

When bar 34 occupies the position shown in Fig. 2, (the full line position of Fig. 6), finger 32 is outwardly extended toward wheel 29 in operative relation thereto, and is contacted by a tooth 31ª of wheel 29 as the wheel is carried past on each revolution of disk 10. The wheel is thereby given a rotation on its own axis through a predetermined angle, which in the present instance is a fifth of a revolution or 72 degrees. This operation will be understood clearly from reference to Figs. 5, 5ª and 5ᵇ, which show successive positions of wheel 29 as it is moved by finger 32, disk 10 being understood to rotate in a left-handed direction as viewed in Fig. 3, and consequently carrying wheel 29 upwardly in Figs. 5, 5ª and 5ᵇ, as indicated by vertical arrows. In the upper figure, tooth 1 of wheel 29 is just coming into contact with the operative finger 32 of bar 34. As the wheel continues in its upward movement to the position of Fig. 5ª, and then continues on up to the final illustrated position of Fig. 5ᵇ, finger 32 gives to wheel 29 a left handed rotation. The length of teeth 31 is so designed that the wheel, which is here shown as having five teeth, will be turned through just one-fifth of a revolution or 72 degrees as it is carried by finger 32, and the next tooth, number 2, is thereby left positioned to be contacted and moved by finger 32 on the succeeding revolution of disk 10.

When bar 34 is moved to the dotted line position of Fig. 6, finger 32 is swung back out of line with the wheel, and finger 33 occupies an operative position with respect thereto, as shown in Fig. 2ª. In this case the teeth contact and are moved by finger 33. It will be obvious that since finger 33 is horizontally located on the opposite side of the wheel axis from finger 32, the wheel is in this case caused to be rotated in the reverse direction.

Wheel 29 being fixed on the end of shaft 26, this described movement transmits motion through gears 25 and 24 to lead screw 21, which finally imparts sliding motion to the aperture plate to shift the light aperture a slight distance either toward or away from the axis of disk 10, as the case may be, on each revolution of the said disk.

Means have now been described for shifting the aperture plate in its guides a slight distance for each revolution of the disk, the direction of movement of the plate depending upon the position occupied by bar 34. Automatic means will now be described for shifting the position of bar 34 as the aperture plate reaches certain predetermined end positions, so that when the aperture plate reaches its end position at either end of its stroke, its direction of motion across disk 10 will automatically be reversed.

For this purpose, bracket 20 is provided with a depending arm 20ᵇ to which is fastened the end of a shifter rod 41. Rod 41 has a sliding fit through a bore 42 provided in the lower inner portion of bracket 23ª, and projects therebeyond to terminate in a shifter member 43, hereinafter more particularly described, which is adapted to shift bar 34 between its two operative positions.

Bracket 38 is provided with means for yieldingly retaining pivoted bar 34 in either of its two positions (see Fig. 6). This means may comprise a cam pin 50 having a sliding fit in a bearing 51 provided in the rear closed portion 52 of bracket 38 and disposed in line with the pivot pin mounting 40 of bar 34. Pin 50 has near its forward end a flange 53, and encircling the pin between this flange and the adjacent end of bearing 51 is an expansion spring 54. On the forward end of pin 50 is formed a cam nose 50ª, which, under the pressure exerted by spring 54, co-operates with a pointed cam 56 formed on bar 34 just opposite pivot pin 40, to yieldingly retain the bar in either the full or dotted line positions of Fig. 6, as will be clearly apparent.

On the end of bar 34 adjacent disk 10 is a ball 60, which is adapted to be contacted by the shifter member 43 of the shifter rod 41 for the purpose of shifting the position of bar 34 when aperture plate 16 reaches its end positions.

Yoke 43 of shifter rod 41 comprises a cross bar 65 connecting a pair of cams 66 and 67 (see Figs. 2 and 7), which are adapted to contact ball 60 to shift bar 34 when aperture plate 16 reaches its end positions. For instance, in Fig. 2 shifter rod 41 and the aperture plate moving bracket 20 are moving outward from the disk axis, as shown by the arrows. When cam 66 is finally carried to the dotted line position by the shifter rod, it will contact ball 60 during its rotation with disk 10, and will throw the ball and bar 34 past the mid-position, when spring 54 will act with cam pin 50 to complete the movement of the parts to the position of Fig. 2ᵃ. This will reverse the direction of rotation of wheel 29, and cause aperture plate 16, bracket 20 and shifter rod 41 to be reversed in motion across disk 10, in the manner previously explained. The parts are then positioned and moving as in Fig. 2ᵃ, and when cam 67 reaches ball 60 in the phase of operation illustrated in that figure, bar 34 will be shifted back to the first position, and the parts will again be reversed in motion across disk 10.

The preferred specific embodiment now described may be arranged in an optical system so that its light aperture will be effective for scanning a view area at a point in the rotation of its carrier disk at which the aperture plate is not in the operation of being shifted thereon. The device will then carry the aperture across the view area in a series of parallel bands, one band being traversed as the aperture is carried over the view area at the completion of one revolution of the carrier disk, the aperture being shifted the width of one band after leaving the view area and while the disk is making its next revolution, and then upon returning to the view area traversing the next band, and so on, to cover the entire area.

The use of my device will now be understood by those versed in the art to which it pertains without the necessity for here further describing optical and electrical picture transmitting systems in which it may be included.

From what has been said, it will be apparent that I have provided a scanning device adapted to transmit views scanned directly from transparencies, photographs, physical objects or images thereof, at will.

A feature of my invention is that the light aperture shifting mechanism may conveniently be so designed that an extremely narrow band of the image is covered during each rotation of the disk, thereby insuring preservation of the greatest amount of structure and detail of the original view.

As another feature of my invention, attention is called to the fact that the device operates with the aperture plate moving in either direction across the view, and that automatic means are provided for shifting its direction of motion as it reaches its end positions, so that as long as the disk rotates the aperture will be oscillated across the view.

While I have herein illustrated and described certain specific means for carrying out an embodiment of my invention, it will be obvious that numerous changes and modifications may be made without departing from the spirit and scope of my invention; and it is therefore to be understood that all such modifications are contemplated within the scope of my invention as expressed in the following claims.

I claim:

1. In a device of the character described, the combination of a carrier adapted to be rotated on an axis, an aperture plate carried about said axis by said carrier, said aperture plate having a light aperture, and means for moving the aperture plate on the carrier as the carrier is rotated, in a direction substantially at right angles to its direction of motion due to rotation about the said carrier axis.

2. In a device of the character described, the combination of a carrier adapted to be rotated on an axis, an aperture plate slidably mounted on said carrier so as to be movable with respect to the axis of rotation of the said carrier, said aperture plate having a light aperture, and means for moving the aperture plate on the carrier as the carrier is rotated.

3. In a device of the character described, the combination of a carrier adapted to be rotated on an axis, an aperture plate slidably mounted on said carrier so as to be movable with respect to the axis of rotation of the said carrier, said aperture plate having a light aperture, and intermittently acting means for moving the aperture plate on the carrier as the carrier is rotated.

4. In a device of the character described, the combination of a carrier adapted to be rotated on an axis, an aperture plate carried about said axis by said carrier, said aperture plate having a light aperture, and intermittently acting means for moving the aperture plate at the end of each revolution about the said carrier axis, in a direction substantially at right angles to its direction of motion due to rotation about the said carrier axis.

5. In a device of the character described, the combination of a carrier adapted to be rotated about an axis, an aperture plate mounted on said carrier to be movable between predetermined limiting end positions in a direction at right angles to the direction of its movement due to rotation of the carrier, said aperture plate having a light aperture, intermittent means for moving the aperture plate on the carrier a short distance during each revolution of the carrier, and means operative when the aperture plate reaches the said limiting end positions on the carrier for automatically reversing its direction of motion thereupon.

6. In a device of the character described, the combination of a carrier adapted to be rotated about an axis, an aperture plate mounted on said carrier to be movable between predetermined limiting end positions in a direction at right angles to the direction of its movement due to rotation of the carrier, said aperture plate having a light aperture, intermittent means for moving the aperture plate on the carrier a short distance during each revolution of the carrier, and means operative when the aperture plate reaches the said limiting end positions on the carrier for automatically shifting the aperture plate moving means to reverse the direction of motion of the aperture plate upon the carrier.

7. In a device of the character described, the combination of a carrier adapted to be rotated about an axis, an aperture plate mounted on said carrier to be movable between predetermined limiting end positions in a direction at right angles to the direction of its movement due to rotation of the carrier, said aperture plate having a light aperture, and means intermittently actuated by contact with a stationary member for moving the aperture plate on the carrier a short distance during each revolution of the carrier.

8. In a device of the character described, the combination of a carrier mounted to rotate on its axis, an aperture plate mounted on said carrier to be movable toward and away from said carrier axis, said aperture plate having a light aperture, a lead screw having screw threaded connection with the aperture plate, and mounted in bearings on the carrier disk, and means for rotating the lead screw on its axis through a predetermined angle during each revolution of the carrier disk.

9. In a device of the character described, the combination of a carrier mounted to rotate on its axis, an aperture plate mounted on said carrier to be movable toward and away from said carrier axis, said aperture plate having a light aperture, a lead screw having screw threaded connection with the aperture plate, and turnably mounted on the carrier, and intermittently actuated means for rotating the lead screw on its axis through a predetermined angle during each revolution of the carrier.

10. In a device of the character described, the combination of a carrier mounted to rotate on its axis, an aperture plate mounted on said carrier to be movable toward and away from said carrier axis, said aperture plate having a light aperture, a lead screw having screw threaded connection with the aperture plate, and turnably mounted on the carrier, lead screw driving means mounted on said carrier, and stationarily mounted means for contacting with said driving means during each revolution of the carrier to effect rotation of the lead screw on its axis through a predetermined angle, whereby the aperture plate is shifted on the carrier during each revolution thereof.

11. In a device of the character described, the combination of a carrier mounted to rotate on its axis, an aperture plate mounted on said carrier to be movable between predetermined end positions toward and away from said carrier axis, said aperture plate having a light aperture, a lead screw having screw threaded connection with the aperture plate, and turnably mounted on the carrier, lead screw driving means mounted on said carrier, stationarily mounted means shiftable between two operative positions for contacting with said driving means during each revolution of the carrier disk to effect rotation of the lead screw on its axis through a predetermined angle in one direction when shifted to one position, and in the other direction when shifted to the other position, whereby the aperture plate is shifted on the carrier during each revolution thereof, in a direction determined by the position occupied by said stationarily mounted shiftable means, and means for shifting said stationarily mounted means when the aperture plate reaches its predetermined end positions.

12. In a device of the character described, the combination of a carrier mounted to rotate on its axis, an aperture plate mounted on said carrier to be movable between predetermined end positions toward and away from said carrier axis, said aperture plate having a light aperture, a lead screw having screw threaded connection with the aperture plate, and turnably mounted on the carrier, lead screw driving means mounted on said carrier, stationarily mounted means shiftable between two operative positions for contacting with said driving means during each revolution of the carrier to effect rotation of the lead screw on its axis through a predetermined angle in one direction when shifted to one position, and in the other direction when shifted to the other position, whereby the aperture plate is shifted on the carrier during each revolution thereof, in a direction determined by the position occupied by said stationarily mounted shiftable means, and automatic means for shifting the position of said stationarily mounted means when the aperture plate reaches its predetermined end positions.

13. In a device of the character described, the combination of a carrier mounted to rotate on its axis, an aperture plate mounted on said carrier to be movable between predetermined end positions, toward and away from said carrier axis, said aperture plate having a light aperture, a lead screw having screw threaded connection with the aperture plate, and turnably mounted in bearings on the carrier, lead screw driving means mounted on said carrier disk, stationarily mounted means shiftable between two operative positions for contacting with said driving means during each revolution of the carrier to effect rotation of the lead screw on its axis through a predetermined angle in one direction when shifted to one position, and in the other direction when shifted to the other position, whereby the aperture plate is shifted on the carrier during each revolution thereof, in a direction determined by the position occupied by said stationarily mounted shiftable means, and means carried by the moving aperture plate for contacting with said stationarily mounted means to cause shifting thereof when said aperture plate reaches its end positions.

In witness that I claim the foregoing I have hereunto subscribed my name this 1st day of February, 1929.

ELMER A. TAMBERT.